(12) United States Patent
Maier et al.

(10) Patent No.: US 7,128,984 B2
(45) Date of Patent: Oct. 31, 2006

(54) SURFACING OF METAL FLUORIDE EXCIMER OPTICS

(75) Inventors: Robert L Maier, Ontario, NY (US); Jue Wang, Fairport, NY (US)

(73) Assignee: Corning Incorporated, Corning, NY (US)

( * ) Notice: Subject to any disclaimer, the term of this patent is extended or adjusted under 35 U.S.C. 154(b) by 56 days.

(21) Appl. No.: 10/930,401

(22) Filed: Aug. 31, 2004

(65) Prior Publication Data

US 2006/0046099 A1 Mar. 2, 2006

(51) Int. Cl.
*B32B 9/00* (2006.01)
(52) U.S. Cl. ............... 428/696; 428/446; 428/698; 428/699; 428/701; 428/702
(58) Field of Classification Search .............. None
See application file for complete search history.

(56) References Cited

U.S. PATENT DOCUMENTS

| | | | |
|---|---|---|---|
| 6,238,479 B1 | 5/2001 | Oba | 117/68 |
| 6,309,461 B1 | 10/2001 | Gianoulakis et al. | 117/206 |
| 6,332,922 B1 | 12/2001 | Sakuma et al. | 117/3 |
| 6,395,657 B1 | 5/2002 | Mayolet et al. | 501/3 |
| 6,562,126 B1 | 5/2003 | Price | 117/81 |
| 6,620,347 B1 | 9/2003 | Lo Iacono | 252/584 |
| 6,872,479 B1 * | 3/2005 | Maier et al. | 428/696 |

OTHER PUBLICATIONS

T.M. Stephen et al.; "Degradation of Vacuum-Exposed SiO$_2$ Laser Windows"; SPIE vol. 1848; Laser-Induced Damage in Optical Materials; 1992 pp. 106-109.
S. Gogoll et al.; "Laser Damage of CaF$_2$ (111) Surfaces at 248 nm"; Applied Surface Science 96-98(1996) 332-340.

\* cited by examiner

*Primary Examiner*—Jennifer C. McNeil
*Assistant Examiner*—Timothy M. Speer
(74) *Attorney, Agent, or Firm*—Walter M. Douglas

(57) ABSTRACT

The invention is directed to improved coated metal fluoride single crystal optical elements suitable for use in below 250 nm optical lithography, and particularly below 200 nm lithography. The coated elements of the invention can be lenses, windows, prisms and other elements used in lithographic methods, including the laser sources used therein. The invention is also directed to a method of removing the quasi-Bielby layer formed when a shaped optical element is polished. Removal of the quasi-Bielby layer prior to coating results in improved durability and optical transmission characteristics of the coated lenses. The coating material can be any material that does not impede the transmission of below 250 nm electromagnetic radiation. Fluorine doped silicon dioxide is the preferred coating material.

7 Claims, 6 Drawing Sheets

SURFACING OF METAL FLUORIDE EXCIMER OPTICS

FIELD OF THE INVENTION

This invention is directed to improved coated optical elements that can be used for the transmission of below 250 nanometer (nm) electromagnetic radiation, and in particular to improved coated alkaline earth metal fluoride optical elements that thereby have greater durability and improved transmissivity for use in the area of optical lithography; and additionally to a method for making such optical elements.

BACKGROUND OF THE INVENTION

The use of high power lasers, for example, those with pulse energy densities (fluence) above 20 mJ/cm$^2$, with pulse lengths in the low nanosecond range, can degrade the optics used in laser lithography systems. T. M. Stephen et al., in their article "Degradation of Vacuum Exposed SiO2 Laser Windows" SPIE Vol. 1848, pp. 106–109 (1992), report on the surface degradation of fused silica in Ar-ion laser. More recently, it has been noticed that there is optical window surface degradation in high peak and average power 193 nm excimer lasers using window materials made from substances other than silica. It is a concern that such degradation will be more severe when existing optical materials are used in 157 nm laser systems. While some solutions, for example, such as using $MgF_2$ as the window or lens material for existing 193 nm laser systems have been proposed, it is believed that such materials will also experience surface degradation with time, leading to the requirement that the expensive windows be periodically replaced. It is further believed that the problem with window degradation will be exacerbated with the advent of laser systems operating at wavelengths below 193 nm. In addition, the use of $MgF_2$ as a window material, while it might be successful from a mechanical viewpoint, presents a problem of color center formation that is detrimental to transmission performance of the laser beam.

Excimer lasers are the illumination sources of choice for the microlithographic industry. While ionic materials as such as crystals $MgF_2$, $BaF_2$ and $CaF_2$ are the materials of choice for excimer optical components due to their ultraviolet transparencies and to their large band gap energies, the preferred material is $CaF_2$. However, crystals of $CaF_2$ and the optical elements made from $CaF_2$, are difficult to optically polish. Furthermore, polished but uncoated surfaces of $CaF_2$ are susceptible to degradation when exposed to powerful excimer lasers operating in the deep ultraviolet ("DUV") range, for example at 248 and 193 nm and the vacuum ultraviolet ("VUV") range, for example at 157 nm. For lasers operating at 193 nm, 2 KHz or 4 KHz, with pulse energy densities of 20–40 mJ/cm$^2$, the surfaces or the optical elements made from these ionic materials are known to fail after only a few million laser pulses. The cause of the damage is thought to be fluorine depletion in the top surface layers of the polished surface. U.S. Pat. No. 6,466,365 (the '365 patent) describes a method of protecting metal fluoride surfaces, such as CaF2, from degradation by use of a vacuum deposition, of a silicon oxyfluoride coating/material. While for the moment this is a reasonable solution, the microlithographic industry constantly demands more performance from excimer sources, and consequently from optical components used in connection with Excimer laser based systems. Therefore, in view of the expected increased industry demands for improved laser performance, it is desirable to find a solution to the optical element degradation problem that will either eliminate the problem or will greatly extend the durability, and consequently the length of time, that existing and future optical components can be used.

SUMMARY OF THE INVENTION

In one aspect, the invention is directed to coated optical elements made from metal fluoride single crystals of formula $MF_2$, where M is calcium, barium, magnesium, or strontium, or mixtures of the foregoing, that are used in below 250 nm lithography, and particularly in below 200 nm lithography.

In another aspect the invention is directed to a coated alkaline earth metal fluoride single crystal optical element suitable for use in optical lithography systems using below 200 nm electromagnetic radiation, said optical element comprising a shaped metal fluoride single crystal having a selected coating material on the element surfaces through which said electromagnetic radiation enters and exits; wherein said coating is on a surface that has been substantially cleaned of the quasi-Bielby layer present on the surface prior to the application of the coating material.

In another aspect the invention is directed to coated $CaF_2$ optical materials that are useful in laser lithography. In particular embodiments, the invention is directed to coated optical path materials for use as windows, lenses and other optical elements below 250 nm, as especially below 200 nm, laser lithography.

The coating material used in accordance with the invention can be any material being transmissive in the X-ray, infrared, UV and visible regions of the electromagnetic spectrum. For applications operating at wavelengths below 250 nm, the preferred coating materials for metals fluoride optical elements, as especially $CaF_2$ optical elements, are silicon nitride, silicon oxynitride, $MgF_2$, doped high purity silica and fluorine doped high purity silica. The coatings are typically deposited on the surface of the optical material by methods known in the art; for example, vapor deposition, chemical vapor deposition ("CVD"), plasma enhanced chemical vapor deposition ("PECVD"), and other "plasma" deposition methods including sputter deposition.

The invention is further directed to a method of making a coated metal fluoride single crystal optical element that is resistant to laser-induced damage by a below 250 nm laser beam, and especially by a below 200 nm laser beam. The method includes the steps of providing an uncoated alkaline earth metal fluoride crystal or element: cutting, grinding and polishing the surface of the crystal or element; etching the cut, ground and polished surface to remove impurities present on the surface in a quasi-Bielby layer; and coating the metal fluoride element surface with a coating of a selected material to thereby form a coated material resistant to laser induced damage. In particular, the invention is directed to $CaF_2$ optical elements made according to the foregoing method.

The invention is further directed to a method for making an alkaline earth metal fluoride single crystal optical element suitable for use in optical lithographic systems using below 250 nm electromagnetic radiation, said method comprising the steps:

obtaining an alkaline-earth metal fluoride single crystal, shaping the single crystal into an optical element using, as necessary, cutting and grinding steps, polishing the surfaces of the shaped element through which the below 250 nm electromagnetic radiation enters and exits, etching the polished surfaces to remove the quasi-Bielby layer resulting from the polishing, coating the etched surface with a selected optical material, and polishing the coated surfaces to thereby form a coated alkaline earth metal fluoride single crystal optical element;

wherein said alkaline earth metal is selected from the group consisting of calcium, barium, magnesium and strontium, or mixtures of any of the foregoing.

DETAILED DESCRIPTION OF THE INVENTION

Figure 1:
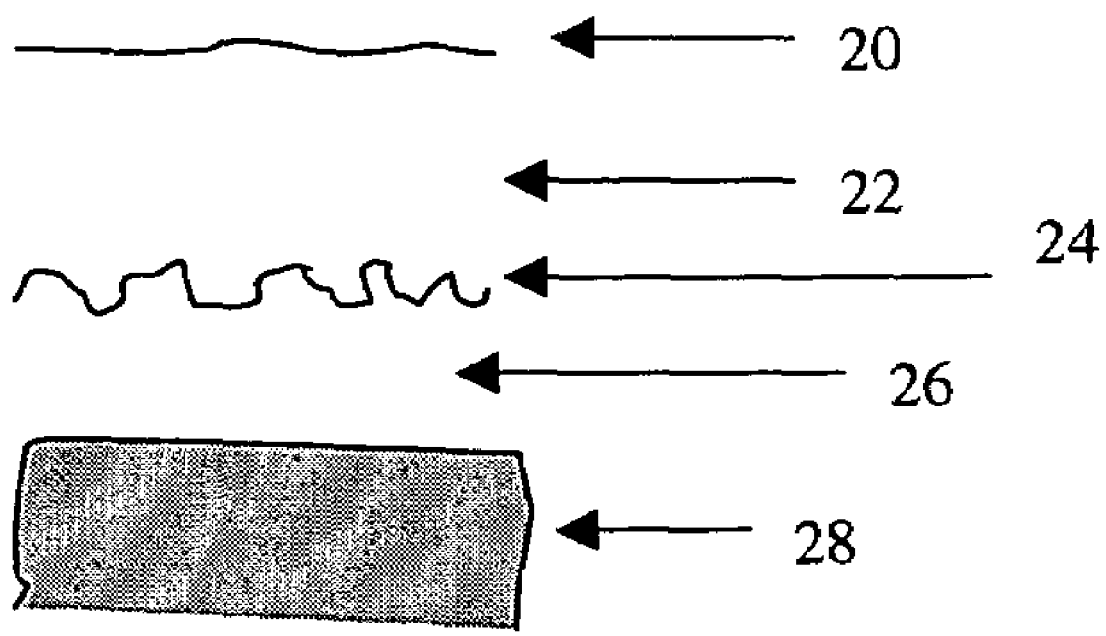
FIG. 1 illustrates the morphology of a polished $CaF_2$ surface

In the following description and in the Figures, CaF2 is used as the exemplary alkaline earth metal fluoride single crystal material that is made into a coated optical element in accordance with the invention. However, it should be remembered that the invention applies to all optical elements made of alkaline earth metal fluorides or elements made from mixtures of such alkaline earth metal fluorides. In addition, the invention applies to all optical element surfaces subjected to cutting, grinding and polishing; for examples the two faces of a laser window or lens.

The invention is directed to coated optical elements made from alkaline earth metal fluorides, and especially to coated optical elements made from calcium fluoride, $CaF_2$, or a mixture of calcium fluoride with one or more other alkaline earth metal such as barium, magnesium or strontium; and to a method of making such elements. The optical elements according to the invention have improved transmission properties and durability.

Metal fluoride single crystals for use in optical lithography method are formed into optical element by cutting, grinding and polishing the surface of a crystal blank. When the metal fluoride is calcium fluoride, or a mixture of calcium fluoride and another alkaline earth metal, it has been found that there is a small but measurable absorption in the polished surfaces of elements made of such crystals. When the surfaces of such elements are subjected to the powerful laser beams, for example, in optical lithographic processes, this small adsorption leads to significant heating and thermal gradients in the optical element. Temperature rises in a $CaF_2$ or other metal fluoride optical element can accelerate damage to the element through a mechanism believed to involve fluorine loss from the element. As a result of this damage the element has a shortened lifetime and powerful wavefront distortions occur particularly for $CaF_2$ due to the fact that it has a large coefficient of thermal expansion. Wavefront distortion degrades optical performance in high precision lens systems such as used in optical lithographic systems. The invention described herein removes or minimizes the substances that cause the absorption and results in surfaces that have improved transmission performance and durability when used for wavelengths below 200 nanometers. This will result in the optical elements having an improved lifetime when used in excimer laser systems that operate at high repetition rates and energy densities.

$CaF_2$ is generally the preferred optical material for DUV and VUV excimer based microlithography due to its isotropic properties and its availability in as a high purity material that can be formed into optical elements (components). Generally, the optical axis of the component is selected as the <111> direction, where the <111> direction is perpendicular to the (111) plane which is the preferred cleavage plane for the material. Like other ionic crystals such as $MgF_2$ and $BaF_2$, $CaF_2$ is prone to chipping and cleavage during mechanical cutting and grinding operations, and is subject to thermal shock. The mechanical operations necessary to shape the optic leave behind deep fractures, known as sub-surface damage ("SSD"), that are very difficult to remove by subsequent fine grinding and polishing operations. Ellipsometric techniques for SSD evaluation of polished crystal surfaces have been developed [see J. Wang et al., "Surface characterization of optically polished $CaF_2$ crystal by quasi-Brewster angle technique", SPIE Proc., Vol. 5188 (2003), pages 106–114].

In general, when optical blanks are shaped, the sawing, grinding and shaping operations are done using diamond and/or alumina based abrasives and saws. Subsequently, the resulting shaped element is subjected to several polishing steps using increasingly finer abrasives to remove specified thicknesses of material at each step. This methodology was developed over the years for amorphous materials such as glass or HPFS (high purity fused silica), and has been found to be useful for crystalline materials, for example, CaF2, using magneto-rheological finishing (MRF) methods. When we used ellipsometry to evaluate the morphology of surfaces polished by such techniques, the ellipsometric analysis revealed that considerable SSD often remains. Hard abrasives, for example, diamond, remove material from the substrate surface by brittle fracture. Considerable force is exerted down into the crystal, causing additional fracturing, or the further propagation of existing fractures from earlier operations, as chunks of material are dislodged. The result is a rough top surface with deep fractures.

Polishing slurries are typically water based, and $CaF_2$ has a small but finite solubility in water. At some point, sufficient $CaF_2$ becomes dissolved in the slurry and precipitates back onto the substrate, along with small particulates removed in polishing, thus filling in voids and producing a smooth top surface. For glass or silica polishing, this smooth top layer containing the particulates is commonly known as the Bielby layer. While in the case of glass and silica very little of the glass or silica is actually dissolved in the slurries, this is not the case for $CaF_2$ polishing. In the case of $CaF_2$, while the top surface of the polished $CaF_2$ looks quite smooth, it is not single crystal material, but instead a contaminated layer comprised mostly of polycrystalline $CaF_2$. The precipitate layer, which we may call the quasi-Bielby layer, contains various contaminants from the slurry, notably metallic impurities, in addition to the polycrystalline $CaF_2$. FIG. 1 illustrates the schematic morphology of typical polished CaF$_2$ element having a top surface 20 of μ-roughness (RMS); an SSD region 24; a precipitate layer 22 (the quasi-Bielby layer) located between the top surface 20 and the SSD region 24; an undisturbed single crystal area 28; and a region of crystal dislocation 26 located between the SSD region 24 and the undisturbed area 28.

Figure 2:
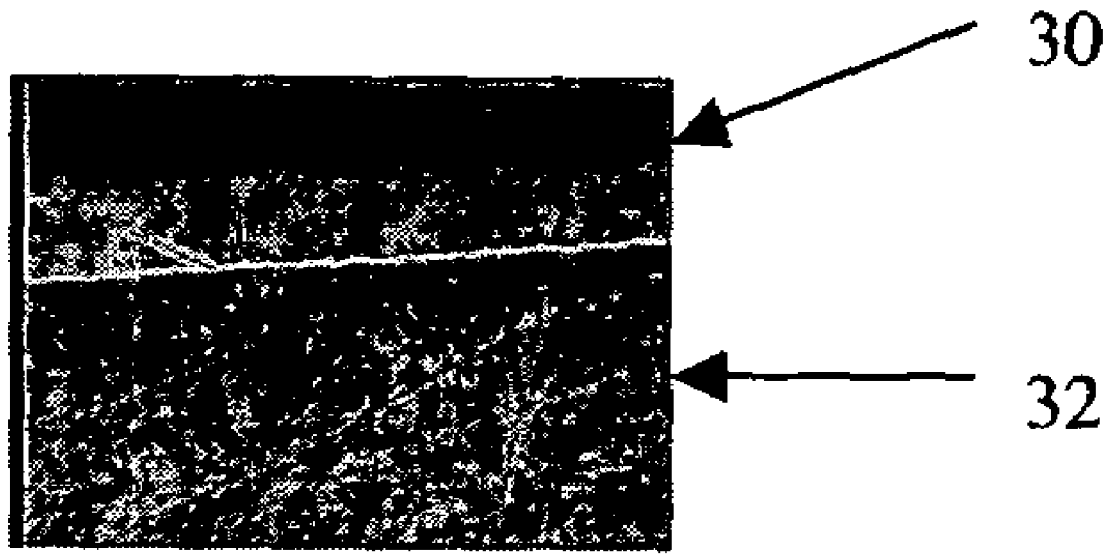
FIG. 2 illustrates the precipitated layer and the DI water revealed SSD of a polished $CaF_2$.

In accordance with the invention, the quasi-Bielby layer on optical element surfaces that have been polished is removed by treatment using an etching method such as water washing, ion milling, ultrasonic cleaning, or dissolved by other appropriate solvents. In the case of CaF2, the etching is easily done using deionized water. FIG. 2 illustrates a polished CaF$_2$ surface that has been half submerged in deionized water to reveal the quasi-Bielby layer 30 and the SSD structure 32. Once the quasi-Bielby layer has been removed, the "polished and etched" surfaces of the element are coated with a selected material as taught in U.S. Pat. No. 6,466,365 (the '365 patent) or other coating material known in the art to be useful for coating element operating at wavelengths below 200 nm, to produce an optical element that has improved durability over that of the '365 patent.

Figure 3:
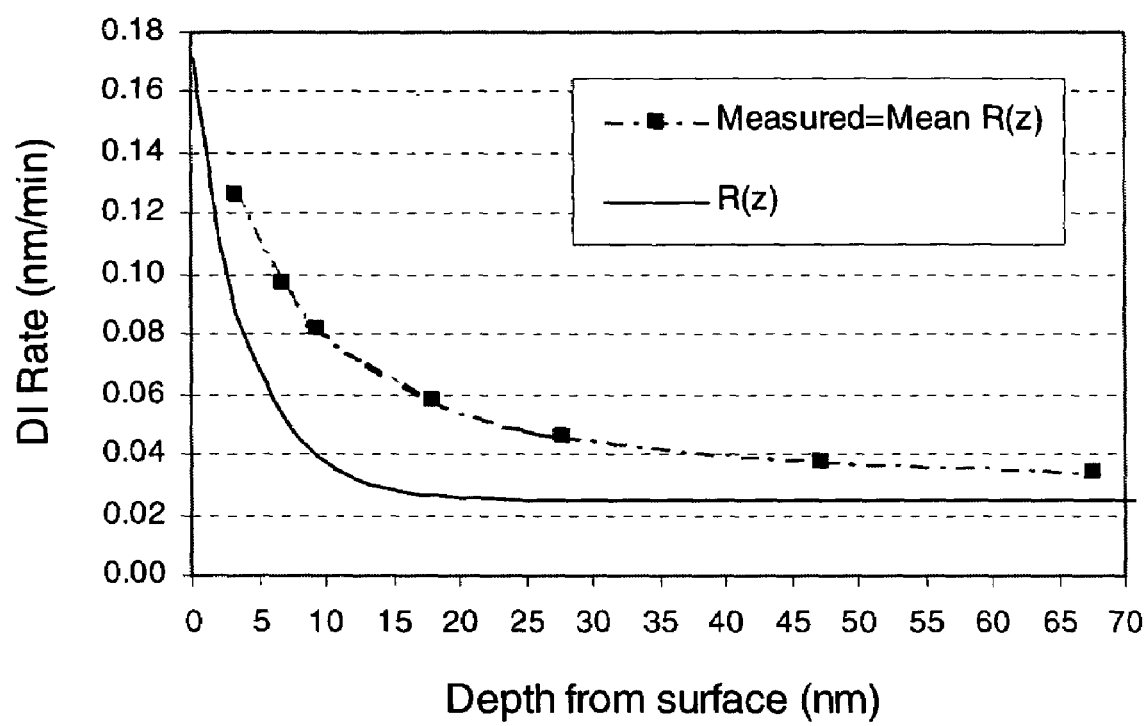
FIG. 3 illustrates the behavior of polished CaF2 with DI water.

We have found that the quasi-Bielby layer of a CaF$_2$ element is quite porous, quite water soluble, and absorbing to wavelengths below 200 nm. FIG. 3 illustrates the measured dissolution rate of the quasi-Bielby layer of a polished CaF$_2$ crystal in deionized water at room temperature. In the limit, the dissolution rate of a polished surface approaches that of a cleaved surface which has been measured at 1.5 nm/hour. The dissolution rate is proportional to the surface area of the material; in this case, the CaF$_2$ surface undergoing deionized water treatment. Dissolution of the quasi-Bielby layer reveals the subsurface structure (SSD). The deionized water removal rate, R(z), of the quasi-Bielby layer to various depths is represented by Equation (1), $$R(z) = R_o + R_s e^{-z/D} \quad (1)$$

where $R_o$ is the bulk dissolution rate of CaF$_2$, as measured from a cleaved sample. The surface effect of the precipitated layer originating from optical polishing described by $R_s$ and D; the former being the dissolution rate at the surface (that is, z=0) and the latter being the characteristic depth of the precipitated layer. $R_s$ and D can be determined by fitting the experimental data. As noted above, Equation (1) is proportional to the effective surface area or porosity distribution.

The experimental results shown in FIG. 3 were obtained at room temperature. In order to obtain accurate dissolution rate distribution, the polished surface was used as the reference for the determination of the removal depth. As a result, the measured removal rate is an average or mean rate over the total removed region as described by in Equation (2). The results obtained using Equations (1) and (2) are shown in FIG. 3.

$$\bar{R}(z) = \frac{1}{z}\int_0^z R(z)dz = R_o + \frac{R_s D}{z}(1 - e^{-z/D}) \quad (2)$$

Figure 4:
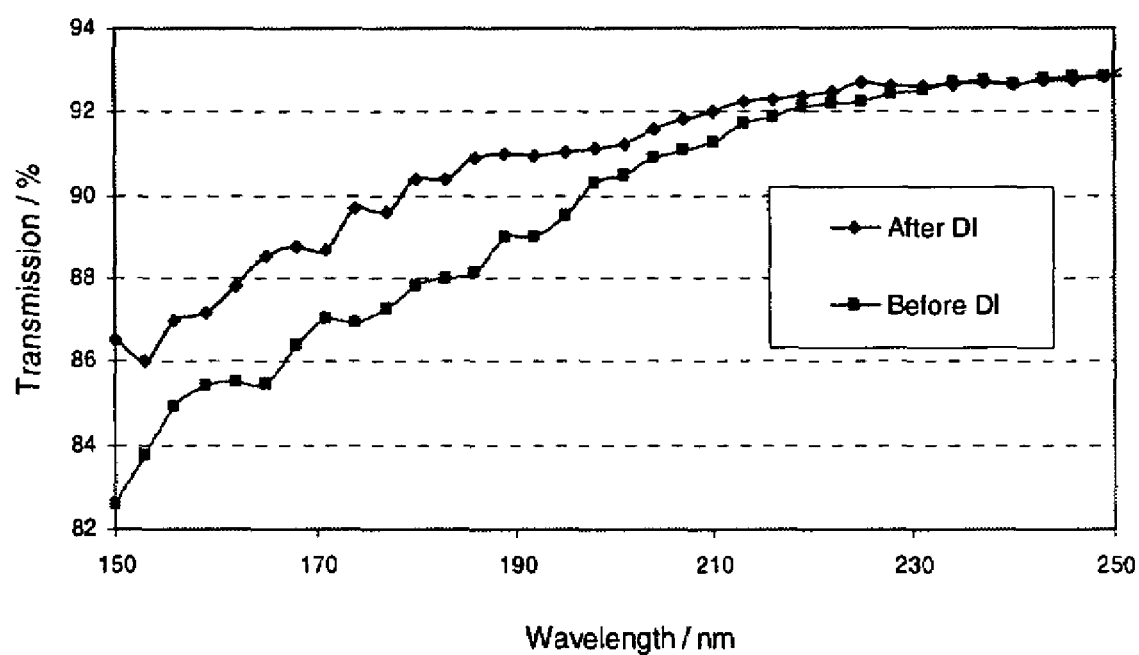
FIG. 4 illustrates the measured percent transmission through a polished $CaF_2$ crystal before and after washing with DI water.
Figure 5A:
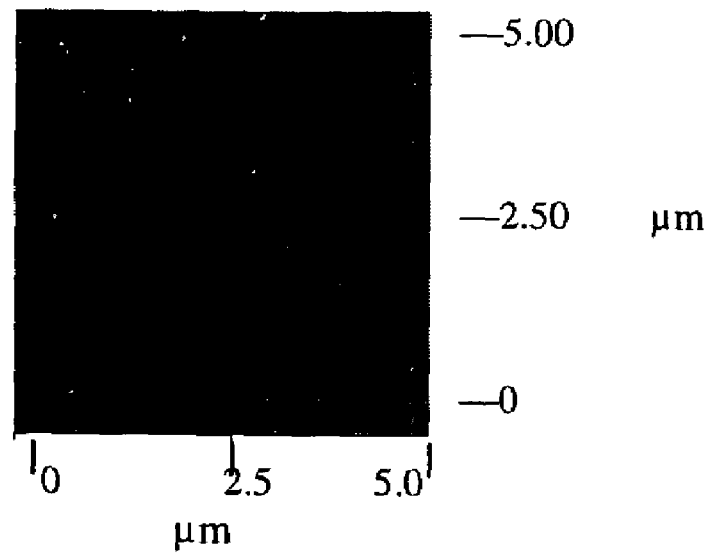
FIG. 5a illustrates a polished $CaF_2$ surface before washing with DI water, the Bielby layer being present.
Figure 5B:
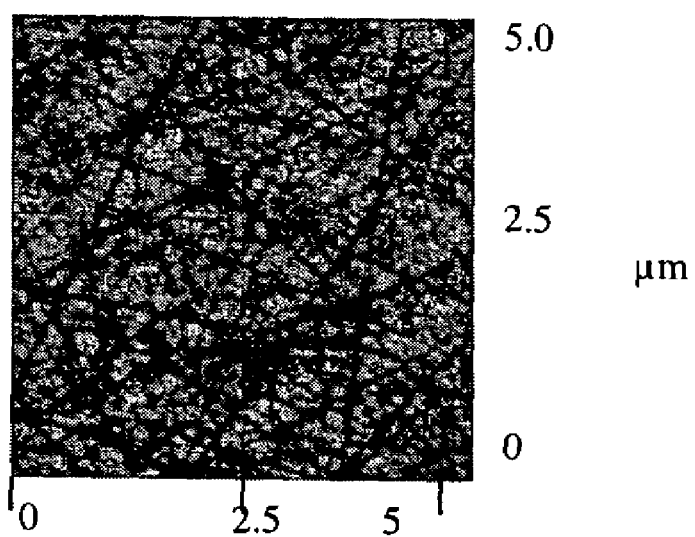
FIG. 5b illustrates a polished $CaF_2$ surface after washing with DI water, the Bielby layer having been removed.

In addition to being a refuge for microcrystals of CaF$_2$ removed from the crystal surface and for the polishing agent, the quasi-Bielby layer is also a refuge for contamination by impurities from the slurry. This was verified by ToF-SIMS analysis. These impurities lead to absorption by the element when used in a laser system. Absorption in polished CaF$_2$ surfaces has been reported at 248 nm by S. Gogall et al. ["Laser damage or CaF$_2$ (111) surfaces at 248 nm", Appl. Surface Science, 96098 (1996), pages 332–340], and will be worse at sub-200 nm wavelengths. FIG. 4 illustrates the measured transmission of a well polished CaF$_2$ crystal before and after treatment with deionized water in accordance with the invention to remove the quasi-Bielby layer that resulted from the polishing procedure on all polished surfaces. The transmission was measured in the range of 150 to 248 nm. The transmission increased after the quasi-Bielby layer was removed; thus demonstrating the absorption within quasi-Bielby layers. It should be specially noted that as the wavelength decreases, the difference between deionized water etched sample, and the non-etched sample becomes greater; thus demonstrating the significant effect that the quasi-Bielby layer has on transmission properties as wavelength decreases. FIG. 5A illustrates a polished CaF$_2$ crystal surface before treatment with deionized water and FIG. 5b illustrates one after deionized water treatment. The deionized water treatment removes the quasi-Bielby layer and reveals the SSD.

The method of the invention can be used with a metal fluoride single crystal grown by any method known in the art; for example, the Bridgman-Stockbarger method. Methods of growing and/or annealing single crystals are also described in U.S. Pat. Nos. 6,395,657 B2, 6,309,461 B1, 6,562,126 B2; 6,332,922 B1; 6,620,347; 6,238,479 B1; and other patents and technical literature known to one skilled in the art. In addition, the method of the invention can be used with a single crystals having any orientation; for example, <100>, <110> and <111> oriented crystals. Once the single crystal was grown, it was cut and polished by methods known in the art; for example, using a diamond blade to cut the crystal to the proper shape, a diamond grinding powder or wheel to give it a final shape, and then polishing the surfaces using any polishing method known in the art; for example, using aluminum oxide as a polishing agent. While the grinding and polishing should be carried out in a manner so as to minimize SSD, it was not necessary to focus on obtaining very smooth top surface roughness (TSR). If the optical material is CaF$_2$, its polished surfaces are next soaked in deionized water or otherwise etched (for example, etched using ion milling) for sufficient time to allow complete dissolution, or removal, of the precipitated layer that results from the polishing step. The water etching can be done by soaking the surface in deionized water at room temperature for a time in the range of 5 to 120 minutes, depending upon the polishing methods used, or by spraying the surface with a gentle stream of deionized water such as may come from a shower head or a kitchen sink water sprayer. Soaking is the preferred method. If the optical material is barium or magnesium fluoride, ion milling or a similar technique using an appropriate solvent is the preferred method of removing the quasi-Bielby layer from the optical element due to the low solubility of these materials in water.

After optical element's surface was etched with deionized water, or otherwise etched, the surface was cleaned using one of the generally accepted methods used prior to vacuum deposition of a material. Such methods include but are not limited to acetone or alcohol drag wipe, alcohol or acetone rinse followed by drip dry or blow dry using filtered air or dry nitrogen. In the subsequent step a dense coating layer as described in U.S. Pat. No. 6,466,365, or otherwise known in the art to be useful for use with optical elements operating at wavelengths below 250 nm, was deposited on the cleaned surfaces of the optical element. Such coating materials include high purity silicon dioxide, silicon nitride, silicon oxynitride, magnesium fluoride, aluminum oxide, fluorine-doped high purity silica and high purity silica doped with a substance other than fluorine such as, for example, aluminum. High purity oxide materials are preferred and fluorine-doped high purity silica is the particularly preferred coating agent. The coating layer was deposited to a thickness in the range of 10 to 10,000 nm. The deposited film replicates the rather large micro-roughness of the etched $MgF_2$ or $BaF_2$ surface, or deionized water etched $CaF_2$ surface. The deposited coating was then optically polished to achieve the desired smoothness. In the case of $CaF_2$, the 0.3 nm rms of the original polished element was re-achieved, but now without the contamination carried by the quasi-Bielby layer. Since there is normally a slight index of refraction difference between the metal fluoride substrate, and the deposited film, care must be taken to control the amount of coating thickness removal in this final polishing step. The desired thickness of the remaining deposition being generally integral multiples of quarter wave optical thickness for the wavelength of use.

In an embodiment of the invention, the quasi-Bielby is removed as described above and the elements are coated as described in the preceding paragraph using the same coating materials. However, after the coating is applied, the element is used as-is in an optical lithography system, and particularly in the laser portion of the lithography system.

Figure 6:
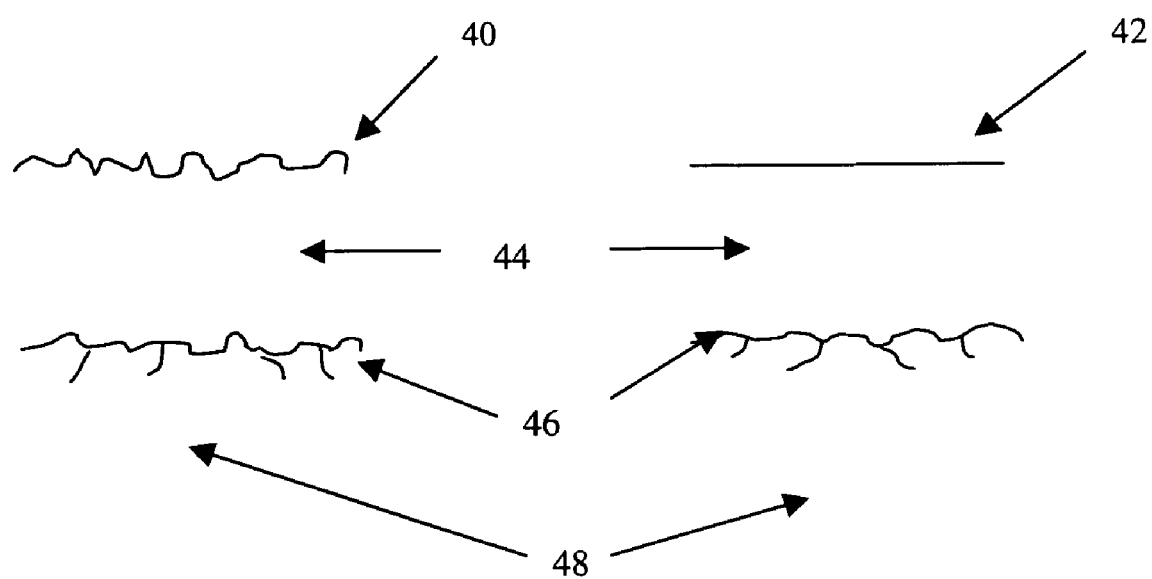
FIG. 6 illustrates the morphology of a $CaF_2$ crystal after water washing and deposition of a coating material according to the invention.

FIG. 6 illustrates the morphology of the coated single crystal of the invention. These crystals are produced according to the method of the invention for producing smooth, transparent surfaces on single crystals of metal fluorides of formula $MF_2$, where M is calcium, barium, magnesium or strontium, or a mixture of any of these in any proportion. The quasi-Bielby layer was first removed using an etching method such as deionized water etch in the case of $CaF_2$ or ion milling in the case of $BaF_2$ and $MgF_2$. A thick layer of the selected coating material was then deposited on the surface of the etched optical element. The deposited oxide coating 40 replicates the TSR of the underlying crystal. The deposited layer is then optically polished or ion milled to a surface roughness typically in the range of 0.1–0.4 nm rms as measured by AFM (atomic force microscope). The vacuum deposited layer 44 replaces the quasi-Bielby layer 20 illustrated in FIG. 1. In FIG. 6, numeral 46 represent the underlying crystal with SSD and numeral 48 is directed to the underlying bulk crystal.

Finally, it is known that laser damage in optical surfaces is more readily initiated at the sharp edges of a surface since the electric field strengths increase in such locations. A further embodiment of the invention is to ion mill a sufficient amount from the deposited film surface (either polished or unpolished). This milling removes any surface contaminants and in addition anneals (heals) the fine structure of the surface. This annealing effect after ion milling was confirmed by power spectral density (PSD) calculations from AFM measurements of the surface.

The present invention has been described in general and in detail by way of examples. Persons skilled in the art understand that the invention is not limited necessarily to the specific embodiments disclosed. Modifications and variations may be made without departing from the scope of the invention as defined by the following claims or their equivalents, including equivalent components presently known, or to be developed, which may be used within the scope of the present invention. Hence, unless changes otherwise depart from the scope of the invention, the changes should be construed as being included herein.

We claim:

1. A coated alkaline earth metal fluoride single crystal optical element suitable for use in optical lithography systems using below 250 nm electromagnetic radiation, said optical element comprising a shaped metal fluoride single crystal having a selected coating material on the element surfaces through which said electromagnetic radiation enters and exits;
   wherein said coating is on a surface that has been cleaned of the quasi-Bielby layer present on the surface prior to the application of the coating material.

2. The optical element according to claim 1, wherein the alkaline earth metal fluoride is selected from the group consisting of calcium fluoride, barium fluoride, magnesium fluoride and strontium fluoride, and mixtures thereof.

3. The optical element according to claim 2, wherein said coating material is selected from the group consisting of high purity silicon dioxide, silicon nitride, silicon oxynitride, magnesium fluoride, aluminum oxide, fluorine-doped high purity silica, and aluminum doped high purity silica.

4. The optical element according to claim 3, wherein the metal fluoride is calcium fluoride and the coating material is fluorine doped high purity fused silica.

5. The optical element according to claim 4, wherein the coating is applied to a thickness in the range of 10 to 10,000 nanometers.

6. The optical element according to claim 1, wherein the coating is applied to a thickness in the range of 10 to 10,000 nanometers.

7. The optical element according to claim 1, wherein said optical element is a calcium fluoride element having a coating of fluorine doped silica deposited on the surfaces through which said electromagnetic radiation enters and exits the element.

* * * * *